US006321300B1

(12) United States Patent
Ornes et al.

(10) Patent No.: US 6,321,300 B1
(45) Date of Patent: Nov. 20, 2001

(54) APPARATUS AND METHOD FOR DYNAMICALLY RECONFIGURABLE TIMED FLUSHING OF A QUEUE OF COALESCING WRITE BUFFERS

(75) Inventors: Matthew D. Ornes, Sunnyvale; James Y. Cho, Los Gatos, both of CA (US)

(73) Assignee: Rise Technology Company, Santa Clara, CA (US)

( * ) Notice: Subject to any disclaimer, the term of this patent is extended or adjusted under 35 U.S.C. 154(b) by 0 days.

(21) Appl. No.: 09/311,987

(22) Filed: May 14, 1999

(51) Int. Cl.[7] .................................................. G06F 12/00
(52) U.S. Cl. ............................ 711/135; 711/136; 711/160
(58) Field of Search ..................................... 711/135, 136, 711/160

(56) References Cited

U.S. PATENT DOCUMENTS 5,664,148 * 9/1997 Mulla et al. ......................... 711/138
6,049,798 * 4/2000 Bishop et al. ........................ 707/10
6,078,587 * 6/2000 Lynch et al. ......................... 370/412
6,130,759 * 10/2000 Blair ................................... 358/1.17

* cited by examiner

Primary Examiner—Matthew Kim
Assistant Examiner—Christian P. Chace
(74) Attorney, Agent, or Firm—Oblon, Spivak, McClelland, Maier & Neustadt, P.C.

(57) ABSTRACT

A write buffer unit operates in a cached memory microprocessor system by dynamically reconfigurable timed flushing of a queue of coalescing write buffers in the unit. Each time an additional one of the coalescing write buffers is allocated, a time-out period is generated which is inversely related to the number of allocated write buffers. After one of the allocated write buffers times out by exceeding the time-out period with no write activity to the coalescing write buffer, a controller in the unit determines the least recently written to allocated write buffer, and generates control signals to flush that write buffer.

23 Claims, 6 Drawing Sheets

APPARATUS AND METHOD FOR DYNAMICALLY RECONFIGURABLE TIMED FLUSHING OF A QUEUE OF COALESCING WRITE BUFFERS

FIELD OF THE INVENTION

This invention relates in general to computer systems having main and cache memories and in particular, to an apparatus and method for dynamically reconfigurable timed flushing of a queue of coalescing write buffers included in such a computer system.

BACKGROUND OF THE INVENTION

A queue of write buffers is commonly employed in cache designs to minimize central processing unit (CPU) pipeline stalls by queuing external bus write requests. Coalescing write buffers which coalesce, combine or merge writes before transmission are particularly useful to reduce the bus bandwidth requirements. Such write buffers allow temporally local writes to a limited number of small areas to be merged together before the data is sent to the external bus.

U.S. Pat. No. 5,561,780 describes a method and apparatus for combining uncacheable write data into cache-line-sized write buffers. As described therein, the uncacheable write data may be a stream of graphics data to be sent to an external frame buffer, or a string move or string write operation. A write buffer is evicted or flushed if the buffer is full of data or if new data is received which cannot be placed in a write buffer. The second situation occurs when all write buffers are allocated (i.e., already storing some data to be transmitted) and the new data cannot be merged into one of the allocated write buffers, because of an address mismatch. Such a situation is highly undesirable since it causes a CPU pipeline stall. Although data stored in partially filled write buffers may be evicted under certain circumstances including the occurrence of a synchronization fence, such provisions fail to guarantee the avoidance of the second situation described above.

SUMMARY OF THE INVENTION

Accordingly, two objects of the present invention are to provide an apparatus and method for dynamically reconfigurable timed flushing of a queue of coalescing write buffers to minimize pipeline stalls.

These and additional objects are accomplished by the various aspects of the present invention, wherein briefly stated, one aspect is an apparatus for dynamically reconfigurable timed flushing of a plurality of coalescing write buffers. Included in the apparatus are means for generating a time-out period inversely related to a count of allocated coalescing write buffers; means for determining a least recently written to allocated coalescing write buffer; and means for generating a signal to flush the least recently written to allocated coalescing write buffer when a period of time since the most recent write to one of the allocated coalescing write buffers exceeds the time-out period.

Another aspect of the invention is a method for dynamically reconfigurable timed flushing of a plurality of coalescing write buffers. The method starts by comparing an address of a buffered write operation against line addresses of allocated coalescing write buffers to determine whether there is a match. If there is a match, the method continues by writing at least a byte of data to corresponding byte locations in the allocated coalescing write buffer whose line address matched with the address of the buffered write operation; setting byte valid bits corresponding to the byte locations; resetting a counter associated with the allocated coalescing write buffer and employed to determine whether a time-out period has expired for the allocated coalescing write buffer; and activating a flip-flop input associated with the allocated coalescing write buffer for determining a least recently written to allocated coalescing write buffer.

On the other hand, if there is no match, the method proceeds by newly allocating an unallocated coalescing write buffer for storing the address of the buffered write operation; updating a state of the newly allocated coalescing write buffer to indicate its allocation; changing the time-out periods for counters associated with all allocated coalescing write buffers; writing at least a byte of data to corresponding byte locations in the newly allocated coalescing write buffer; setting byte valid bits corresponding to the byte locations; resetting a counter associated with the newly allocated coalescing write buffer and employed to determine whether a time-out period has expired for the newly allocated coalescing write buffer; and activating a flip-flop input associated with the newly allocated coalescing write buffer for determining a least recently written to allocated coalescing write buffer.

Preferably, the method also includes the step of detecting whether a time-out period has expired for one of the allocated coalescing write buffers. If a time-out period has expired, then the method proceeds by checking the states of all coalescing write buffers to determine which ones are allocated; determining a least recently written to allocated coalescing write buffer from outputs of flip-flops having inputs associated with the allocated coalescing write buffers; and generating a signal to flush the least recently written to allocated coalescing write buffer.

Still another aspect of the invention is a write buffer unit configured to operate in conjunction with a cache memory in a microprocessor system. Included in the write buffer unit are a controller; a plurality of coalescing write buffers coupled to the controller; means, including the controller, for generating a time-out period inversely related to a number totaling the allocated coalescing write buffers; means, including the controller, for determining a least recently written to allocated coalescing write buffer; and means, including the controller, for generating a signal to flush the least recently written to allocated coalescing write buffer when a period of time initiated by a most recent write to one of the allocated coalescing write buffers exceeds the time-out period.

Additional objects, features and advantages of the various aspects of the present invention will become apparent from the following description of its preferred embodiments, which description should be taken in conjunction with the accompanying drawings.

DESCRIPTION OF THE PREFERRED EMBODIMENTS

Figure 1:
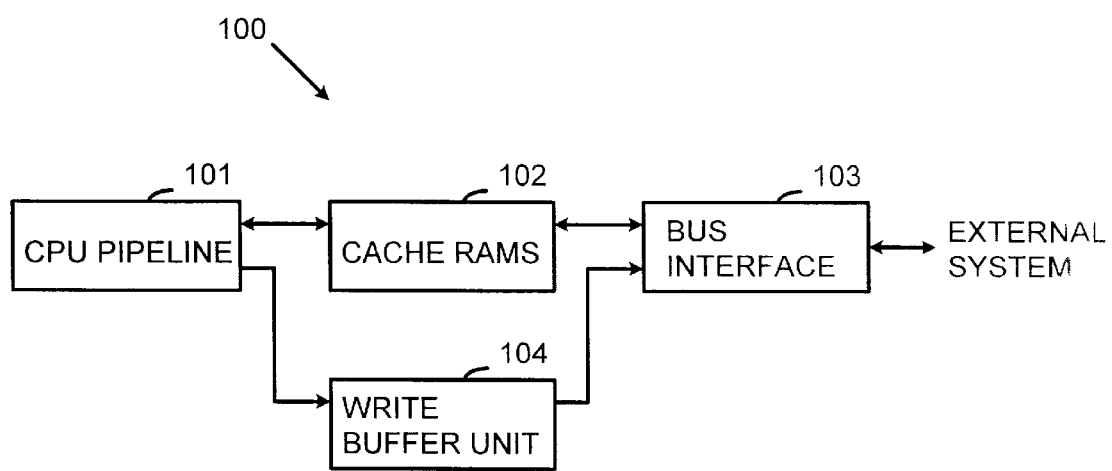
FIG. 1 illustrates a block diagram of a portion of a microprocessor system.

FIG. 1 illustrates a block diagram of a portion of a microprocessor system 100 having a microprocessor or central processor unit (CPU) pipeline 101, a cache memory 102, a bus interface 103, and a write buffer unit 104. As is well known in such systems, a microprocessor (not shown) is coupled to the CPU pipeline 101, an external system including various components such as a main memory (not shown) are coupled to the bus interface 103, and the cache memory 102 includes fast random-access-memories (RAMS).

The cache memory 102 is conventionally configured with a tag cache and a data cache. Since each addressed line of the data cache stores, for example, thirty-two (32) bytes of data and the external system data bus is, for example, only eight (8) bytes wide, the bus interface 103 under the control of a cache control circuit (not shown) selects the proper eight (8) bytes stored in the data cache, and sends it to the addressed location in main memory. Conversely, when eight (8) bytes of data are read from the main memory, the bus interface 103 under the control of the cache control circuit stores the eight (8) bytes in the proper locations in a thirty-two (32) byte wide line of the data cache.

In conventional write back operation, the cache control circuit determines whether there is a "hit" in the data cache when the microprocessor initiates a write operation to the main memory. If there is a "hit," then the microprocessor writes data to the identified location in the data cache, sets a "dirty" bit, and goes on performing other important tasks. Since the cache memory 102 is much faster than the main memory, this significantly reduces the time spent by the microprocessor in performing the write operation, increasing system efficiency. The cache control circuit can subsequently update the appropriate location in main memory and unset the "dirty" bit, transparent to the microprocessor.

On the other hand, if there is a "miss," then in write allocation mode, the cache control circuit first reads the addressed data from main memory, stores it in an appropriate line location in the data cache, then the microprocessor writes to that line location just as if that line had originally caused a "hit." As can be appreciated, this considerably increases the time spent by the microprocessor in performing the write operation since it must wait for the slow main memory read cycle to complete before writing to the data cache.

There are two situations when the microprocessor attempts to write directly to the main memory. The first situation is when uncacheable or uncached data is being written to main memory. The second situation is in a write through operation. Both situations cause CPU pipeline stalls in which the microprocessor has to wait for the slow main memory to complete the write operation. The write buffer unit 104 is therefore included in the microprocessor system 100 to minimize CPU pipeline stalls in such situations.

Figure 2:
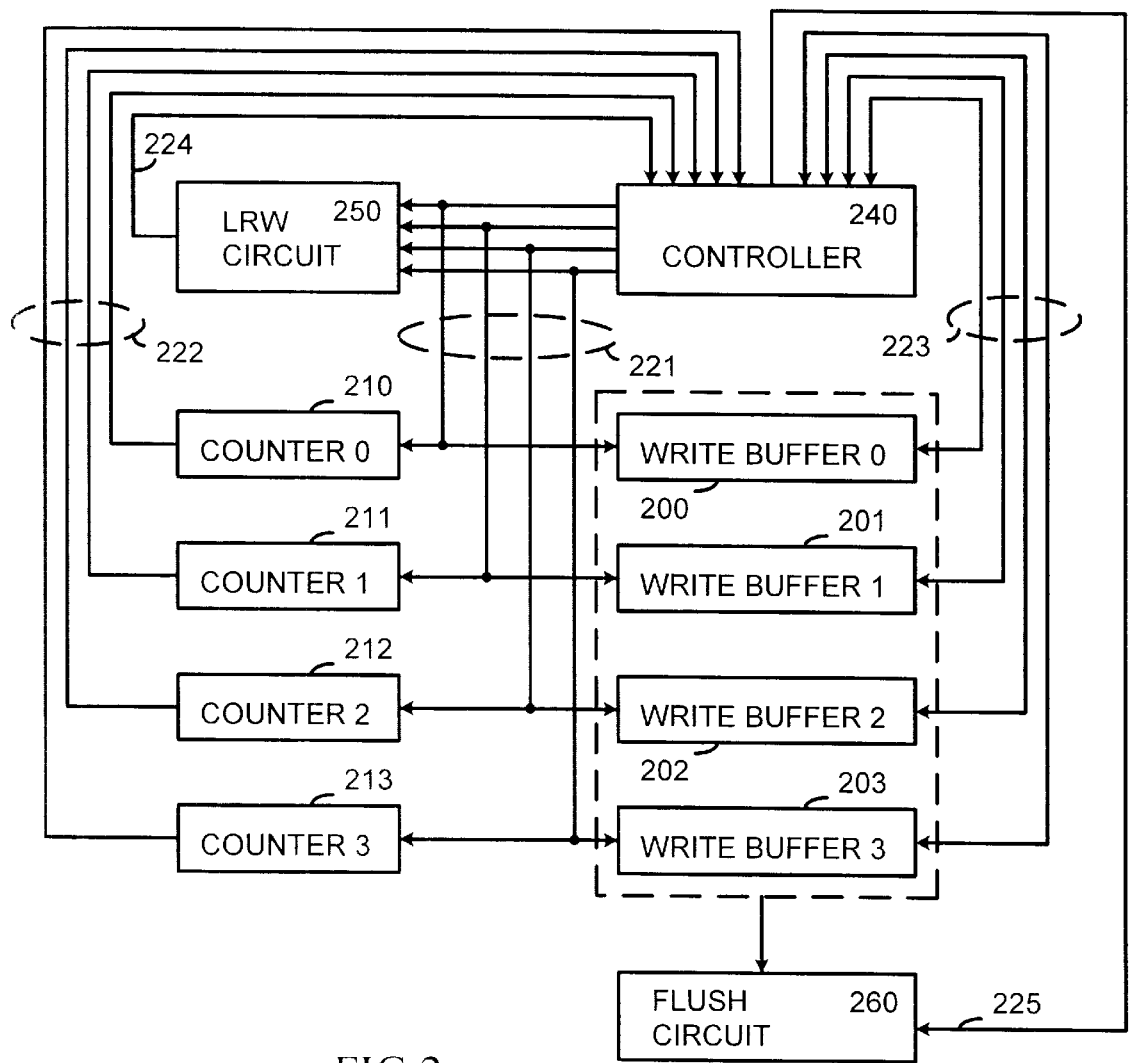
FIG. 2 illustrates a block diagram of a write buffer unit included in the microprocessor system.

FIG. 2 illustrates a block diagram of the write buffer unit 104. The write buffer unit 104 includes four coalescing write buffers 200~203, four corresponding counters 210~213, a write buffer controller 240, a least recently written to (LRW) circuit 250, and a flush circuit 260. To simplify the description, only components and connections pertinent to the present invention are shown and described herein. Other components and connections conventionally employed in write buffers are not shown since they add little to the understanding of the present invention and their construction and operation are well known in the art.

Each time data is be written to one of the write buffers 200~203, the controller 240 activates a corresponding one of the lines 221 so that the appropriate one of the write buffers 200~203 is enabled, the appropriate one of the counters 210~213 is reset, and the appropriate input to the LRW circuit 250 is activated. Outputs of the counters 210~213 are provided to the controller 240 via lines 222 so that the controller 240 can detect if one of the counters 210~213 has timed-out. Outputs of the LRW circuit 250 are provided to the controller 240 via lines 224 so that the controller 240 can determine which of the write buffers 200~203 was least recently written to. Lines 223 allow the controller 240 to write to and read certain fields of the write buffers 200~203. When the controller 240 detects that one of the counters 210~213 has timed-out, the controller 240 determines which of the write buffers 200~203 was least recently written to, and generates a signal activating line 225 to flush the least recently written to one of the write buffers 200~203.

Preferably, the controller 240 comprises hard-wired logic configured to perform the tasks described herein. An alternative implementation for the controller 240 is a processor programmed to perform the such tasks. The counters 210~213 are conventional four-bit counters, incremented each clock cycle of a clock signal also provided to the microprocessor. The flush circuit 260 includes a 4:1 multiplexer which passes the data stored in only one of the write buffers 200~203 to the bus interface 103. In this case, the flush signal 225 is select signals controlling the selection of the 4:1 multiplexer, and bus interface control signals causing the passed data to be sent to the appropriate address of the main memory through the bus interface 103.

Figure 3:
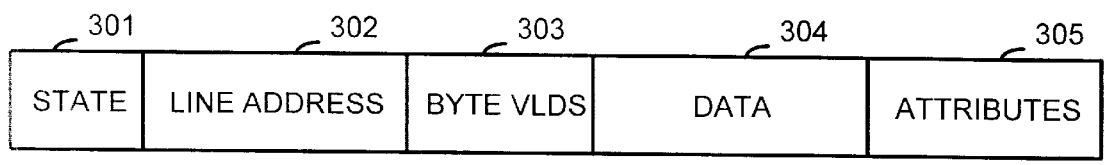
FIG. 3 illustrates a representative one of four coalescing write buffers included in the write buffer unit.

FIG. 3 illustrates conventional fields for a representative one of the coalescing write buffers 200~203. A state field 301 indicates information such as whether or not any of the data stored in the write buffer are invalid, whether a flush is pending (i.e., unflushed data has been written to the write buffer), and whether a flush is active. As used herein, the term "allocated write buffer" means a write buffer in the "flush is pending" state. An "unallocated write buffer" means a write buffer in the "invalid" state.

A data field 304 includes storage locations for thirty-two (32) bytes of data. Data is written to the write buffer up to eight (8) bytes at a time, and as discretely as one (1) byte at a time by enabling appropriate byte locations as indicated by byte valid bits passed with the data. The write buffer is referred to as a "coalescing write buffer," because it combines or merges byte writes into the data field until the write buffer is flushed or drained.

A line address field 302 indicates the physical page or frame in the main memory to which the data stored in the data field 304 are to be written. A byte valids (BYTE VLDS) field 303 includes, in this case, thirty-two (32) bits, one for each data byte location in the data field 304. Each bit indicates whether data has been written to its corresponding byte location. After flushing, all bits are reset. An attributes field 305 indicates various attributes of the data such as whether the data is cachable or uncachable.

Figure 4:
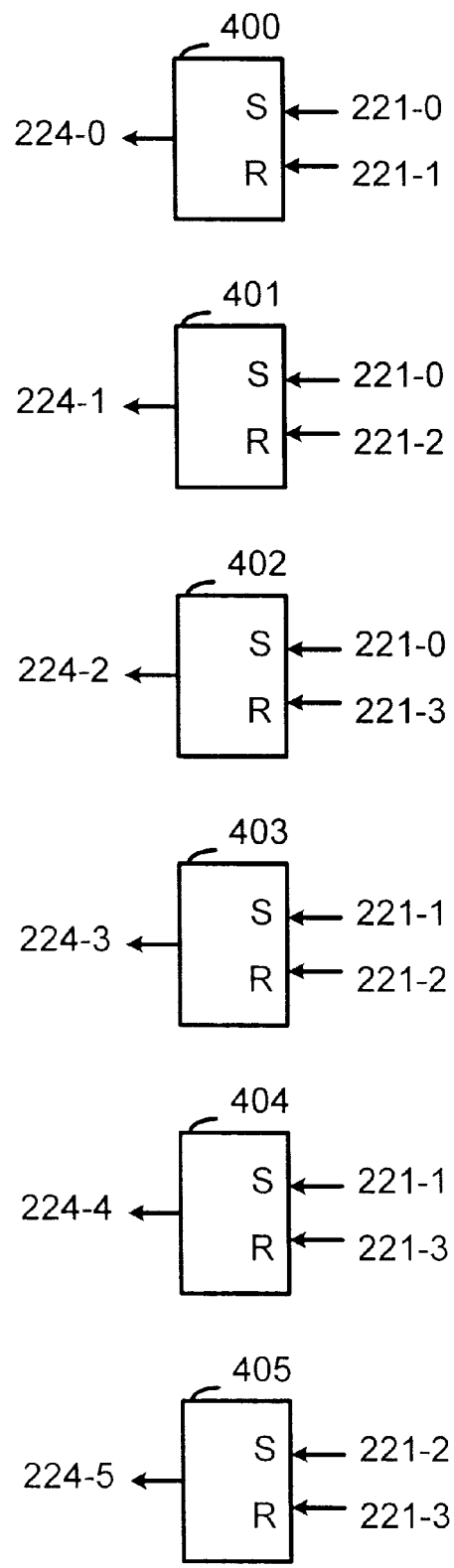
FIG. 4 illustrates a set of S-R flip-flops included in an LRW circuit of the write buffer unit.

FIG. 4 illustrates a set of S-R flip-flops 400~405 included in the LRW circuit 250 of the write buffer unit 104. The number of flip-flops is determined from the number of write buffers such that every combination of pairs of write buffers can be accounted for. In the present example, six (6) S-R flip-flops 400–405 are employed to account for every combination of pairs of the write buffers 200–203. By inspecting the states of the write buffers 200–203 and the outputs of the flip-flops 400–405, it can be readily determined which one of the write buffers was least recently written to.

In an alternative embodiment, the LRW circuit 250 is eliminated by increasing the size of the counters 210–213. In such case, the least recently written to write buffer is simply determined by detecting the first counter to time-out among the counters corresponding to allocated write buffers.

Figure 5:
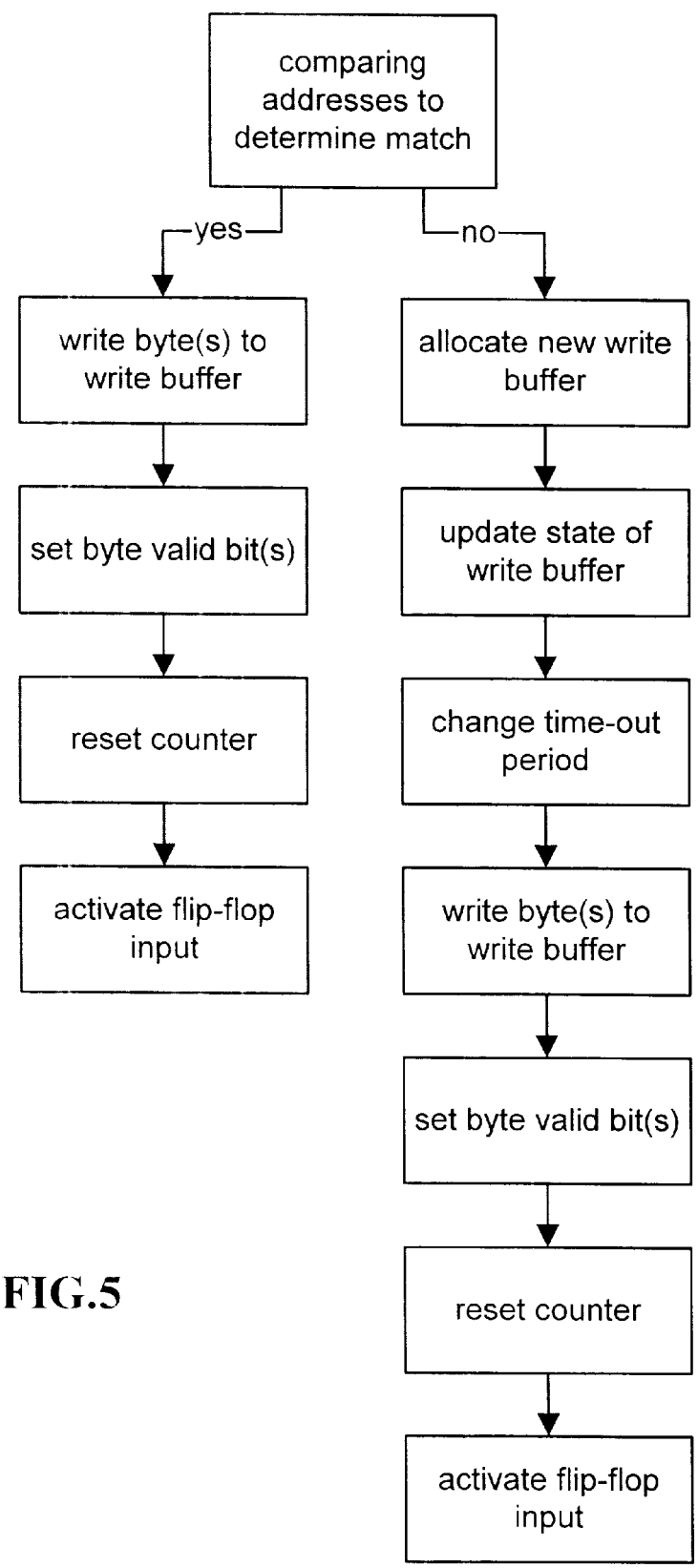
FIG. 5 illustrates a flow diagram of steps performed by the controller of the write buffer unit when writing data to the write buffers.

FIG. 5 illustrates a flow diagram of steps performed by the controller 240 of the write buffer unit 104 when writing data to the write buffers 200–203. In a first step 501, the controller 240 performs the step of comparing an address of a buffered write operation against line addresses of allocated coalescing write buffers to determine whether there is a match. The address for the write operation is provided through the CPU pipeline 101 in a conventional manner, and compared against line addresses 302 of allocated write buffers to determine a match. The allocated write buffers are determined by reading the state fields 301 of the write buffers.

If there is a match, then steps 502–505 are performed by the controller 240. In step 502, the controller 240 performs the step of writing at least a byte of data to corresponding byte locations in the allocated coalescing write buffer whose line address matched with the address of the buffered write operation. In step 503, the controller performs the step of setting byte valid bits corresponding to the byte locations, wherein the byte valid bits being set are in the byte valids field 303 of the write buffer being written to. In step 504, the controller 240 performs the step of resetting a counter associated with the allocated coalescing write buffer and employed to determine whether a time-out period has expired for the allocated coalescing write buffer. In step 505, the controller 240 performs the step of activating a flip-flop input associated with the allocated coalescing write buffer for determining a least recently written to allocated coalescing write buffer.

As an illustrative example of these steps, if the address for the buffered write operation is matched with the address stored in line address 302 of write buffer 201, then in step 502, the controller 240 causes at least a byte of data to be stored in the write buffer 201 according to conventional byte valid information provided with the data; in step 503, the controller 240 sets the corresponding byte valid bits in the byte valids field 303 of the write buffer 201; in step 504, counter 211, which corresponds to write buffer 201, is reset; and in step 505, activating line 221-1 causes flip-flop 400 to be reset (indicating that write buffer 201 was more recently written to than write buffer 200), flip-flop 403 to be set (indicating that write buffer 201 was more recently written to than write buffer 202), and flip-flop 404 to be set (indicating that write buffer 201 was more recently written to than write buffer 203).

On the other hand, if there is no match, then steps 506–512 are performed by the controller 240. In step 506, the controller 240 performs the step of newly allocating an unallocated coalescing write buffer to the address of the buffered write operation. Unallocated write buffers are determined by identifying write buffers having state fields 301 in an invalid state. In step 507, the controller 240 performs the step of updating a state of the newly allocated coalescing write buffer to indicate its allocation. In particular, to allocate the write buffer, the state field 301 is placed in a flush pending state, and the address for the buffered write operation is written into the line address 302 of the newly allocated write buffer.

In step 508, the controller 240 performs the step of changing the time-out periods for counters associated with all allocated coalescing write buffers. In particular, each time an additional write buffer is allocated, the controller 240 generates a time-out period inversely related to a count or number of allocated coalescing write buffers. In a first embodiment, the time-out period is generated by looking up the time-out period corresponding to the count or number of allocated write buffers from a look-up table. In a second embodiment, the time-out period is generated by calculating the time-out period corresponding to the count or number of allocated write buffers using a predetermined formula. In a third embodiment, the time-out period is generated by masking out one additional bit of the four-bit counters 210–213 each time an additional one of the write buffers 200–203 is allocated.

As an example of the third embodiment, when a first write buffer is allocated, no bits are masked so that the time-out period corresponds to the maximum count of the four-bit counters, which in this case would be F hex (1111). When a second write buffer is allocated, the most significant bit is masked so that the time-out period corresponds to the maximum count of a three-bit counter, which in this case would be 7 hex (x111). When a third write buffer is allocated, the remaining most significant bit is masked so that the time-out period corresponds to the maximum count of a two-bit counter, which in this case would be 3 hex (xx11). Finally, when a fourth write buffer is allocated, the remaining most significant bit is masked so that the time-out period corresponds to the maximum count of a 1-bit counter, which in this case would be 1 hex (xxx1).

In step 509, the controller 240 performs the step of writing at least a byte of data to corresponding byte locations in the allocated coalescing write buffer whose line address matched with the address of the buffered write operation. In step 510, the controller performs the step of setting byte valid bits corresponding to the byte locations, wherein the byte valid bits being set are in the byte valids field 303 of the write buffer being written to. In step 511, the controller 240 performs the step of resetting a counter associated with the allocated coalescing write buffer and employed to determine whether a time-out period has expired for the allocated coalescing write buffer. In step 512, the controller 240 performs the step of activating a flip-flop input associated with the allocated coalescing write buffer for determining a least recently written to allocated coalescing write buffer. Steps 509–512 are substantially identical to corresponding steps 502–505.

Figure 6:
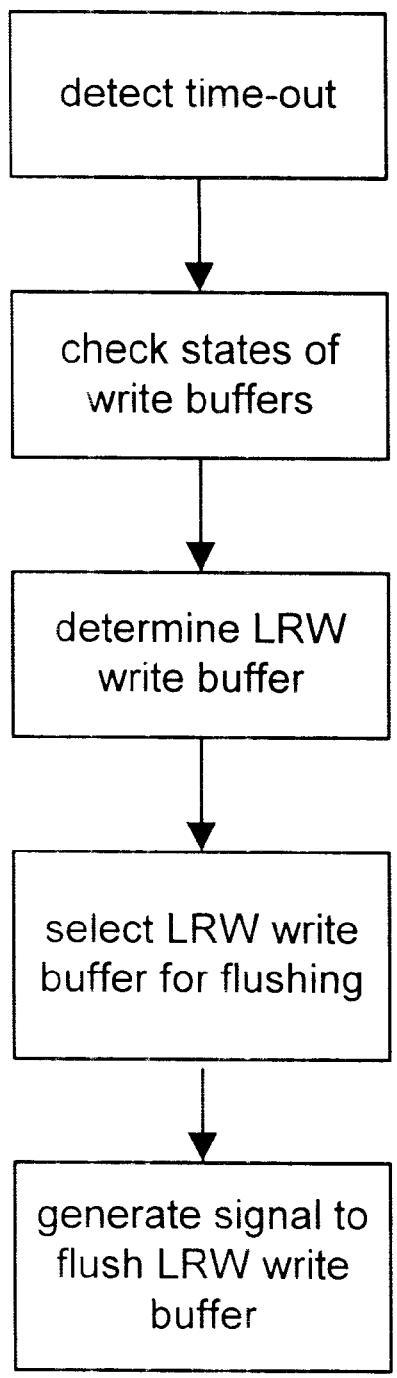
FIG. 6 illustrates a flow diagram of steps performed by the controller of the write buffer unit when generating a flush signal after detecting a time-out situation.

FIG. 6 illustrates a flow diagram of steps performed by the controller 240 of the write buffer unit 104 when generating a flush signal 225 after detecting a time-out situation. In a step 601, the controller 240 performs the step of detecting whether a time-out period has expired for one of the allocated coalescing write buffers. In the third embodiment described above, this is done simply by determining if any of the counters 210–213 have reached their maximum count after masking out the appropriate number of bits. Then, if a time-out period has expired, in step 602, the controller 240 performs the step of checking the states of all coalescing write buffers to determine which ones are allocated coalescing write buffers.

In step 603, the controller 240 next performs the step of determining a least recently written to allocated coalescing write buffer from outputs of flip-flops 400–405 having inputs associated with the allocated coalescing write buffers. As an example of this step 603, if only write buffers 200 and 201 are allocated, then the controller 240 need only look at the output of flip-flop 400 to determine the least most recently written to allocated coalescing write buffer. On the other hand, if write buffers 200, 201 and 202 are allocated, then the controller 240 looks at the outputs of flip-flops 400, 401 and 403 to determine the least recently written to allocated coalescing write buffer.

Finally, in step 605, the controller 240 performs the step of generating a signal 225 to flush the least recently written to allocated coalescing write buffer. The controller 240 may at that time, also set the state field 301 of the write buffer to the "flush is active" state indicating that the write buffer is temporarily neither allocated nor available for allocation until its flushing is completed. After completion of the flushing, the controller 240 resets the state field 301 of the write buffer to the "invalid" state indicating that the write buffer is once again available for allocation.

Although the various aspects of the present invention have been described with respect to a preferred embodiment, it will be understood that the invention is entitled to full protection within the full scope of the appended claims.

What is claimed is:

1. An apparatus for dynamically reconfigurable timed flushing of a plurality of coalescing write buffers, comprising:
   means for generating a time-out period, decrementing the time-out period when a coalescing write buffer is allocated, and incrementing the time-out period when said coalescing write buffer is deallocated;
   means for determining a least recently written to allocated coalescing write buffer; and
   means for generating a signal to flush said least recently written to allocated coalescing write buffer when a period of time initiated by a most recent write to one of said allocated coalescing write buffers exceeds said time-out period.

2. The apparatus according to claim 1, wherein said means for generating a time-out period comprises:
   means for determining the count of allocated coalescing write buffers from state fields of the coalescing write buffers; and
   means for determining the time-out period corresponding to said count.

3. The apparatus according to claim 1, wherein said means for generating a time-out period comprises:
   means for determining the count of allocated coalescing write buffers from state fields of the coalescing write buffers; and
   means for calculating the time-out period corresponding to said count.

4. The apparatus according to claim 1, wherein said means for generating a time-out period comprises:
   means for determining the count of allocated coalescing write buffers from state fields of the coalescing write buffers; and
   means for generating the time-out period corresponding to said count.

5. The apparatus according to claim 1, wherein said means for determining a least recently written to allocated coalescing write buffer, comprises:
   a plurality of flip-flops, one for each combination of pairs of coalescing write buffers; and
   means for determining allocated coalescing write buffers from state fields of the coalescing write buffers, and determining the least recently written to allocated coalescing write buffer from outputs of the flip-flops corresponding to the allocated coalescing write buffers.

6. The apparatus according to claim 1, wherein said means for determining a least recently written to allocated coalescing write buffer, comprises a plurality of counters, individually corresponding to a respective one of said plurality of coalescing write buffers and reset each time said respective coalescing write buffer is written to.

7. The apparatus according to claim 1, wherein said means for generating a signal to flush said least recently written to allocated coalescing write buffer further comprises:
   a plurality of time-out counters, each said time-out counter individually corresponding to a respective one of said plurality of coalescing write buffers and reset each time said respective one of said plurality of coalescing write buffers is written to; and
   means for generating the signal to flush said least recently written to allocated coalescing write buffer when one of said plurality of time-out counters indicates a count value equal to or greater than a count value corresponding to said time-out period.

8. The apparatus according to claim 7, wherein said means for generating a time-out period comprises:
   means for determining the count of allocated coalescing write buffers from state fields of the coalescing write buffers; and
   means for generating the time-out period corresponding to said count.

9. The apparatus according to claim 8, wherein the number of said plurality of coalescing write buffers is "n," each of said plurality of counters is an "n"-bit counter, and said means for generating the time-out period corresponding to said count does so from the maximum count generated after masking off one additional bit of each of said "n"-bit counters each time a coalescing write buffer is newly allocated.

10. The apparatus according to claim 9, wherein the number of said plurality of coalescing write buffers is four, each of said plurality of counters is a four-bit counter, and said means for generating the time-out period corresponding to said count does so from the maximum count generated from each of said four-bit counters when only one coalescing write buffer is allocated, from the maximum count generated after masking off one bit of each of said four-bit counters when a second coalescing write buffer is allocated, from the maximum count generated after masking off two bits of each of said four-bit counters when a third coalescing write buffer is allocated, and from the maximum count generated after masking off three bits of each of said four-bit counters when a fourth coalescing write buffer is allocated.

11. A method for dynamically reconfigurable timed flushing of a plurality of coalescing write buffers, comprising:
   comparing an address of a buffered write operation against line addresses of allocated coalescing write buffers to determine whether there is a match;
   if there is a match;
   writing at least a byte of data to corresponding byte locations in the allocated coalescing write buffer whose line address matched with the address of the buffered write operation;
   setting byte valid bits corresponding to said byte locations;
   resetting a counter associated with the allocated coalescing write buffer and employed to determine whether a time-out period has expired for the allocated coalescing write buffer; and activating a flip-flop input associated with the allocated coalescing write buffer for determining a least recently written to allocated coalescing write buffer; and if there is no match;

newly allocating an unallocated coalescing write buffer to the address of the buffered write operation;

updating a state of said newly allocated coalescing write buffer to indicate its allocation;

changing the time-out periods for counters associated with all allocated coalescing write buffers;

writing at least a byte of data to corresponding byte locations in the newly allocated coalescing write buffer;

setting byte valid bits corresponding to said byte locations;

resetting a counter associated with the newly allocated coalescing write buffer and employed to determine whether a time-out period has expired for the newly allocated coalescing write buffer; and activating a flip-flop input associated with the newly allocated coalescing write buffer for determining a least recently written to allocated coalescing write buffer.

12. The method according to claim 11, further comprising:

detecting whether a time-out period has expired for one of the allocated coalescing write buffers;

if a time-out period has expired;

checking the states of all coalescing write buffers to determine which ones are allocated coalescing write buffers;

determining a least recently written to allocated coalescing write buffer from outputs of flip-flops having inputs associated with the allocated coalescing write buffers; and generating a signal to flush said least recently written to allocated coalescing write buffer.

13. A write buffer unit configured to operate in conjunction with a cache memory in a microprocessor system, said write buffer unit comprising:

a controller;

a plurality of coalescing write buffers coupled to said controller;

means, including said controller, for generating a time-out period inversely related to a number totaling the allocated coalescing write buffers;

means, including said controller, for determining a least recently written to allocated coalescing write buffer; and means, including said controller, for generating a signal to flush said least recently written to allocated coalescing write buffer when a period of time initiated by a most recent write to one of said allocated coalescing write buffers exceeds said time-out period.

14. The write buffer unit according to claim 13, wherein said means for generating a time-out period comprises:

means for determining the number of allocated coalescing write buffers from state fields of the coalescing write buffers; and means for generating the time-out period corresponding to said count.

15. The write buffer unit according to claim 14, wherein said means for determining a least recently written to allocated coalescing write buffer, comprises:

a plurality of flip-flops, one for each combination of pairs of coalescing write buffers; and means for determining allocated coalescing write buffers from state fields of the coalescing write buffers, and determining the least recently written to allocated coalescing write buffer from outputs of the flip-flops corresponding to the allocated coalescing write buffers.

16. The write buffer unit according to claim 15, wherein said means for generating a signal to flush said least recently written to allocated coalescing write buffer comprises:

a plurality of counters, individually corresponding to a respective one of said plurality of coalescing write buffers and reset each time said respective coalescing write buffer is written to; and means for generating the signal to flush said least recently written to allocated coalescing write buffer when one of said plurality of counters indicates a count output equal to or greater than a count value corresponding to said time-out period.

17. The write buffer unit according to claim 16, wherein said means for generating a time-out period comprises:

means for determining the number of allocated coalescing write buffers from state fields of the coalescing write buffers; and means for generating the time-out period corresponding to said count.

18. The write buffer unit according to claim 17, wherein the number of said plurality of coalescing write buffers is "n," each of said plurality of counters is an "n"-bit counter, and said means for generating the time-out period corresponding to said count does so from the maximum count generated after masking off one additional bit of each of said "n"-bit counters each time a coalescing write buffer is newly allocated.

19. An apparatus for dynamically reconfigurable timed flushing of a plurality of coalescing write buffers, comprising:

at least one time-out generator logic, coupled to said plurality of coalescing write buffers and configured to decrement a time-out period when a coalescing write buffer is allocated and to increment the time-out period when said coalescing write buffer is deallocated;

an LRW logic device, coupled to said at least one time-out generator logic and configured to determine a least recently written to allocated coalescing write buffer; and a control logic, coupled to said LRW logic device and to said at least one time-out generator logic, said control logic configured to generate a signal to flush said least recently written to allocated coalescing write buffer when a period of time initiated by a most recent write to one of said allocated coalescing write buffers exceeds said time-out period.

20. The apparatus of claim 19, wherein said plurality of coalescing write buffers comprise state fields comprising state information processed by said at least one time-out generator logic.

21. The apparatus of claim 19, wherein said plurality of coalescing write buffers comprise state fields comprising state information processed by said LRW logic device.

22. The apparatus of claim 19, wherein said LRW logic device comprises a plurality of flip-flops.

23. The apparatus of claim 19, wherein said at least one time-out generator logic comprises a plurality of counters.

* * * * *